United States Patent [19]

Kodama

[11] 4,386,163
[45] May 31, 1983

[54] FLUOROPHOSPHATE OPTICAL GLASS

[75] Inventor: Hiroyuki Kodama, Tokyo, Japan

[73] Assignee: Nippon Kogaku K.K., Tokyo, Japan

[21] Appl. No.: 334,571

[22] Filed: Dec. 28, 1981

[30] Foreign Application Priority Data

Jan. 20, 1981 [JP] Japan .................................. 56/5948

[51] Int. Cl.³ ........................... C03C 3/16; C03C 3/18
[52] U.S. Cl. ....................................... 501/44; 501/48; 501/903
[58] Field of Search ........................... 501/903, 44, 48

[56] References Cited

U.S. PATENT DOCUMENTS 3,954,484  5/1976  Bromer et al. ......................... 501/44
3,979,322  9/1976  Alexeev et al. .................... 501/48 X

FOREIGN PATENT DOCUMENTS 1406134  9/1975  United Kingdom .................. 501/44

OTHER PUBLICATIONS

Leidtorp, R. A., "Vitrification and Crystallization Capacity of BaPO₃F-AlF₃ (GaF₃)-(Li, Na, K, Zn, Cd, Pb)F$_x$ Glasses" Izv. Akad. Nauk. SSSR, Neorg. Mater. (1972)8 (11) pp. 2053–2054.

Primary Examiner—Helen M. McCarthy
Attorney, Agent, or Firm—Fitzpatrick, Cella, Harper & Scinto

[57] ABSTRACT

Fluorophosphate optical glass has the following composition in percent by weight:
(a) By metaphosphate raw material conversion:

| | |
|---|---|
| Al(PO₃)₃ | 13.0–39.0 |
| Mg(PO₃)₂ | 0–24.0 |
| Ca(PO₃)₂ | 1.0–20.0 |
| Ba(PO₃)₂ | 5.0–19.0 |

(The total amount of metaphosphate raw materials is 31–49 percent by weight.)
(b) By fluoride raw material conversion:

| | |
|---|---|
| MgF₂ | 2.0–13.0 |
| SrF₂ | 0–20.0 |
| BaF₂ | 1.0–33.0 |
| AlF₃ | 0–8.0 |
| YF₃ | 0–8.0 |

(The total amount of fluoride raw materials is 19–47 percent by weight.)
(c) By oxide raw material conversion:

| | |
|---|---|
| BaO | 10.0–36.0 |
| Y₂O₃ and/or Yb₂O₃ | 1.5–12.0 |
| ZnO | 0–6.0 |
| PbO | 0–29.0 |
| Nb₂O₅ | 0–22.0 |

(The total amount of oxide raw materials is 20–42 percent by weight.)

4 Claims, 2 Drawing Figures

○ THE PRESENT INVENTION
× USP 3954484

FLUOROPHOSPHATE OPTICAL GLASS

BACKGROUND OF THE INVENTION

1. Field of the Invention

This invention relates to the composition of fluorophosphate optical glass holding high anomalous partial dispersion and having a relatively high refractive index, and the optical constants thereof are such that the refractive index ($\eta d$) amounts to 1.58–1.70 and the Abbe number ($\nu d$) amounts to 39–70.

2. Description of the Prior Art

Optical glass having anomalous partial dispersion is very important to optical systems and has high utility since it makes modification of secondary spectrum possible in lens designing. Numerous reports have already been made of fluorophosphate glass having anomalous partial dispersion and having a refractive index ($\eta d$) less than 1.55 and, in practice, such glass has recently been used for telescope objective lenses or photographic lenses or the like. On the other hand, among lens designers, there has heretofore been a strong demand for glass having a higher refractive index ($\eta d > 1.58$) and dispersion ($\nu d < 70$) and also holding anomalous partial dispersion. As optical glass having such optical properties, a glass composition comprising $MgF_2$ 0.1–1.5, $CaF_2$ 0.1–1.5, $SrF_2$ 0–12.5, $AlF_3$ 0–10.0, $LaF_3$ 0.1–1.5, $Al(PO_3)_3$ 8.0–12.0, $Mg(PO_3)_2$ 3.0–25.0, $Ba(PO_3)_2$ 10.0–18.0, $BaO$ 26.2–55.0, $B_2O_3$ 0–9.0, $GeO_2$ 0–10.0, $TiO_2$ 0–4.0 and $Nb_2O_5$ 0–20.0 (all being percent by weight) is known, for example, from Japanese Patent Publication No. 28169/1978 (corresponding to U.S. Pat. No. 3,954,484). However, this glass is relatively high in liquid phase temperature and unstable for devitrification, and is not suitable for production on an industrial scale. Further, the great BaO content in this glass leads to high dispersion and insufficient anomalous partial dispersion.

SUMMARY OF THE INVENTION

It is an object of the present invention to overcome the above-noted disadvantages and to provide fluorophosphate optical glass which has a refractive index ($\eta d$) in the range of 1.58–1.70 and Abbe number ($\nu d$) in the range of 39–70 and holds anomalous partial dispersion and which is excellent in chemical durability and stable for devitrification and can be produced on an industrial scale.

The fluorophosphate optical glass according to the present invention includes $Al(PO_3)_3$, $Ca(PO_3)_2$, $MgF_2$, $BaF_2$, $BaO$, $Y_2O_3$ and/or $Yb_2O_3$ are requisite components, and has $Y_2O_3$ and/or $Yb_2O_3$ and $Ca(PO_3)_2$ introduced into a five-component system $Al(PO_3)_3$-$Ba(PO_3)_2$-$MgF_2$-$BaF_2$-$BaO$, thereby reducing the liquid phase temperature of the glass and also enhancing the liquid phase viscosity and greatly improving the devitrification resistance. $Y_2O_3$ and $Yb_2O_3$ have the effect of not enhancing the dispersion but enhancing the refractive index, and addition of even a small amount of these materials results in a great effect, and the glass of the present composition has lower dispersion and higher refractive index than the conventional fluorophosphate glass. Further, $Y_2O_3$ and $Yb_2O_3$ have the effect of enhancing the chemical durability and the glass of the present invention has excellent chemical durability. $Ca(PO_3)_2$, in addition to improving the devitrification resistance as mentioned hereinbefore, enhances the chemical durability. It also has the effect of reducing the cracking by the quenching during glass molding, thus facilitating the molding.

The glass of the present invention permits the addition of components such as $Mg(PO_3)_2$, $SrF_2$, $YF_3$, $ZnO$ and $Nb_2O_5$, in addition to the aforementioned eight components.

The composition range of the fluorophosphate optical glass according to the present invention will be shown below in percent by weight.

(a) By metaphosphate raw material conversion:

| | |
|---|---|
| $Al(PO_3)_3$ | 13.0–39.0 |
| $Mg(PO_3)_2$ | 0–24.0 |
| $Ca(PO_3)_2$ | 1.0–20.0 |
| $Ba(PO_3)_2$ | 5.0–19.0 |

(The total amount of metaphosphate raw materials is 31–49 percent by weight.)

(b) By fluoride raw material conversion:

| | |
|---|---|
| $MgF_2$ | 2.0–13.0 |
| $SrF_2$ | 0–20.0 |
| $BaF_2$ | 1.0–33.0 |
| $AlF_3$ | 0–8.0 |
| $YF_3$ | 0–8.0 |

(The total amount of fluoride raw materials is 19–47 percent by weight.)

(c) By oxide raw material conversion:

| | |
|---|---|
| $BaO$ | 10.0–36.0 |
| $Y_2O_3$ and/or $Yb_2O_3$ | 1.5–12.0 |
| $ZnO$ | 0–6.0 |
| $PbO$ | 0–29.0 |
| $Nb_2O_5$ | 0–22.0 |

(The total amount of oxide raw materials is 20–42 percent by weight.)

The range of content of each component has been determined by the following reasons.

The use of at least two kinds of metaphosphate is necessary to reduce the liquid phase temperature and stabilize the glass for devitrification and the total amount thereof is in the range of 31–49 percent by weight.

Aluminum metaphosphate $Al(PO_3)_3$ has the effect of enhancing the devitrification resistance and chemical durability, and if less than 13.0 percent, it will be extremely unstable for devitrification and will be deteriorated in chemical durability. If it exceeds 39.0 percent, it will remain unmolten during melting and will require a long time for melting and will become unstable for devitrification.

Magnesium metaphosphate $Mg(PO_3)_2$ and calcium methaphosphate $Ca(PO_3)_2$ both have a great glass forming ability and stabilize the glass for devitrification. Further, they have the effect of not enhancing the dispersion but improving the chemical durability. $Mg(PO_3)_2$, if it exceeds 24.0 percent, will become unstable for devitrification. $Ca(PO_3)_2$, if it is less than 1.0 percent and if it exceeds 20.0 percent, will become unstable for devitrification. Also, $Ca(PO_3)_2$ strengthens the glass structure and imparts solidity to the glass and reduces the cracking by the quenching during molding and therefore, 1.0 percent or more of $Ca(PO_3)_2$ must be contained in the glass.

Barium metaphosphate $Ba(PO_3)_2$ has the effect of enhancing the refractive index and if less than 5.0 percent, it will not provide an intended refractive index and will become unstable for devitrification. If it exceeds 19.0 percent, it will become very unstable for devitrification.

As regards fluorides, a total amount 19–47 percent by weight of them need be contained, and coexistence of three or more components is more preferable to reduce the liquid phase temperature and stabilize the glass for devitrification.

Magnesium fluoride $MgF_2$ has the effect of not enhancing the dispersion but suppressing the devitrification and delicately strengthening the glass structure and increasing the chemical durability and mechanical strength. $MgF_2$, if it is less than 2.0 percent and if it exceeds 13.0 percent, will become unstable for devitrification, and if it is less than 2.0 percent, will be deteriorated in chemical durability.

Strontium fluoride $SrF_2$ and barium fluoride $BaF_2$ both have a drawback of enhancing the dispersion, but have the effect of enhancing the refractive index and holding the stability for devitrification. $SrF_2$, it is exceeds 20.0 percent, will become unstable for devitrification. $BaF_2$, as compared with $SrF_2$, has a great effect of enhancing the refractive index and is effective for devitrification resistance. $BaF_2$, if it is less than 1.0 percent and if it exceeds 33.0 percent, will become unstable for devitrification and, if it is less than 1.0 percent, the refractive index ($\eta d$) will be 1.59 or less.

Aluminum fluoride $AlF_3$ has the effect of reducing the dispersion and enhancing the chemical durability. $AlF_3$, if it exceeds 8.0 percent, will become extremely unstable for devitrification. Yttrium fluoride $YF_3$ has the effect of not enhancing the dispersion but enhancing the refractive index and improving the chemical durability. $YF_3$, if it exceeds 80 percent, will increase its tendency toward devitrification.

As oxide components, BaO, $Y_2O_3$, ZnO, PbO and $Nb_2O_5$ can be introduced and the total amount of these is in the range of 20–42 percent by weight.

Barium oxide BaO has the following effect: (1) not enhancing the dispersion so much but enhancing the refractive index; (2) enhancing the viscosity of molten glass liquid and stabilizing the glass for devitrification; and (3) reducing the voltalization of fluoride components because the melting temperature becomes relatively low (below 1100° C.). If BaO is less than 10.0 percent, the refractive index ($\eta d$) will become 1.59 or less, and BaO (except the composition containing $Nb_2O_5$ or PbO) will not be stable for devitrification. BaO, if it exceeds 36.0 percent, will remain unmolten during melting and will increase its tendency toward devitrification and enhance the dispersion.

Yttrium oxide $Y_2O_3$ and ytterbium oxide $Yb_2O_3$ both have the effect of not enhancing the dispersion but enhancing the refractive index and are further effective to suppress the devitrification and improve the chemical durability. $Y_2O_3$ and/or $Yb_2O_3$, if less than 1.5 percent, will result in a refractive index ($\eta d$) of less than 1.59 and will be unstable for devitrification. $Y_2O_3$ and/or $Yb_2O_3$, if it exceeds 12.0 percent, will increase its tendency toward devitrification. The effect of $Y_2O_3$ or $Yb_2O_3$ enhances particularly when used with BaO.

Zinc oxide ZnO has the effect of stabilizing the glass for devitrification and can be contained up to 6.0 percent, and if this percentage is exceeded, ZnO will enhance the dispersion. Lead oxide PbO and niobium oxide $Nb_2O_5$ enhance the refractive index and also greatly enhance the dispersion. Therefore, the optical constants greatly vary from the conventional phosphoric acid bicrown area and reach the areas of bicrown, barium flint and barium biflint. As compared with borosilicate glass which already exists in these areas, PbO and $Nb_2O_5$ have the features that they have anomalous partial dispersion and have good chemical durability. PbO can be contained up to 29.0 percent and $Nb_2O_5$ can be contained up to 22.0 percent, and if these percentages are exceeded, they will become unstable for devitrification.

Of the above-described first composition range, according to a second composition range in which
PbO is 0 wt.% and
$Nb_2O_5$ is 0 wt%,
there can be obtained optical glass of low dispersion in which the Abbe number ($\nu d$) is 67 or greater.

Of the second composition range, glass of the following third composition range (indicated in percent by weight) is more stable for devitrification and more excellent in chemical durability.

(a) As expressed as metaphosphate raw materials:

| | |
|---|---|
| $Al(PO_3)_3$ | 18.0–28.0 |
| $Mg(PO_3)_2$ | 0 |
| $Ca(PO_3)_2$ | 1.0–10.0 |
| $Ba(PO_3)_2$ | 10.0–15.0 |

(The total amount of metaphosphate raw materials is 33–44 percent by weight.)

(b) As expressed as fluoride raw materials:

| | |
|---|---|
| $MgF_2$ | 2.0–10.0 |
| $SrF_2$ | 0 |
| $BaF_2$ | 1.0–0.33 |
| $AlF_2$ | 2.0–8.0 |
| $YF_2$ | 0 |

(The total amount of fluoride raw materials is 19–36 percent by weight.)

(c) As expressed as oxide raw materials:

| | |
|---|---|
| BaO | 14.0–35.0 |
| $Y_2O_3$ and/or $Yb_2O_3$ | 1.5–5.0 |
| ZnO | 0 |
| PbO | 0 |
| $Nb_2O_5$ | 0 |

(The total amount of oxide raw materials is 30–39 percent by weight.)

Of the third composition range, in a fourth composition range in which
$Ca(PO_3)_2$ is 1.0–5.0 wt.%
$Ba(PO_3)_2$ is 12.0–15.0 wt.% and
BaO is 20.0–35.0 wt.%,
there can be obtained optical glass of higher refractive index.

Of the fourth composition range, the glass in the following fifth composition range (indicated in percent by weight) is low in liquid phase temperature and particularly stable for devitrification.

(a) As expressed as metaphosphate raw materials:

| | |
|---|---|
| $Al(PO_3)_3$ | 20.0–25.0 |
| $Mg(PO_3)_3$ | 0 |

-continued

| | |
|---|---|
| Ca(PO$_3$)$_2$ | 1.0–3.0 |
| Ba(PO$_3$)$_2$ | 13.0–15.0 |

(The total amount of metaphosphate raw materials is 33–41 percent by weight.)

(b) As expressed as fluoride raw materials:

| | |
|---|---|
| MgF$_2$ | 3.0–9.0 |
| SrF$_2$ | 0 |
| BaF$_2$ | 13.0–20.0 |
| AlF$_3$ | 2.0–5.0 |

(The total amount of fluoride raw materials is 19–30 percent by weight).

(c) As expressed as oxide raw materials:

| | |
|---|---|
| BaO | 25.0–35.0 |
| Y$_2$O$_3$ and/or Yb$_2$O$_3$ | 1.5–3.0 |
| ZnO | 0 |
| PbO | 0 |
| Nb$_2$O$_5$ | 0 |

(The total amount of oxide raw materials is 30–37 percent by weight.)

Of such fifth composition range, the optical glass in a sixth composition range in which BaO is 30.0–35.0 wt.% is high in viscosity of molten glass liquid and easier to be molded during casting.

In the present invention, metaphosphate having in itself a glass forming ability has been used as phosphate, but the use of carbonate and phosphoric acid instead of metaphosphate (for example, BaCO$_3$ and H$_3$PO$_4$ instead of Ba(PO$_3$)$_2$) and the use of pyrophosphate instead of a mixture of oxide and metaphosphate (for example, Ba$_2$P$_2$O$_7$ instead of BaO and Ba(PO$_3$)$_2$) is all right if they are in said composition ranges.

Also, the use of BaCO$_3$ instead of BaO is ordinary.

The fluorophosphate optical glass according to the present invention can be produced by using corresponding metaphosphate, fluoride, oxide, carbonate, etc. as the raw material of each component, scaling and mixing them so that they assume the compounding ratio based on the composition according to the present invention, placing them into a platinum crucible in an electric furnace heated to 1000°–1300° C. and melting, clarifying and stirring them to homogenize them, and then casting and gradually cooling them.

BRIEF DESCRIPTION OF THE DRAWINGS

The drawings show comparison between the optical glass of each embodiment of the present invention and that disclosed in Japanese Patent Publication No. 28169/1978.

DESCRIPTION OF THE PREFERRED EMBODIMENTS

Figure 1:
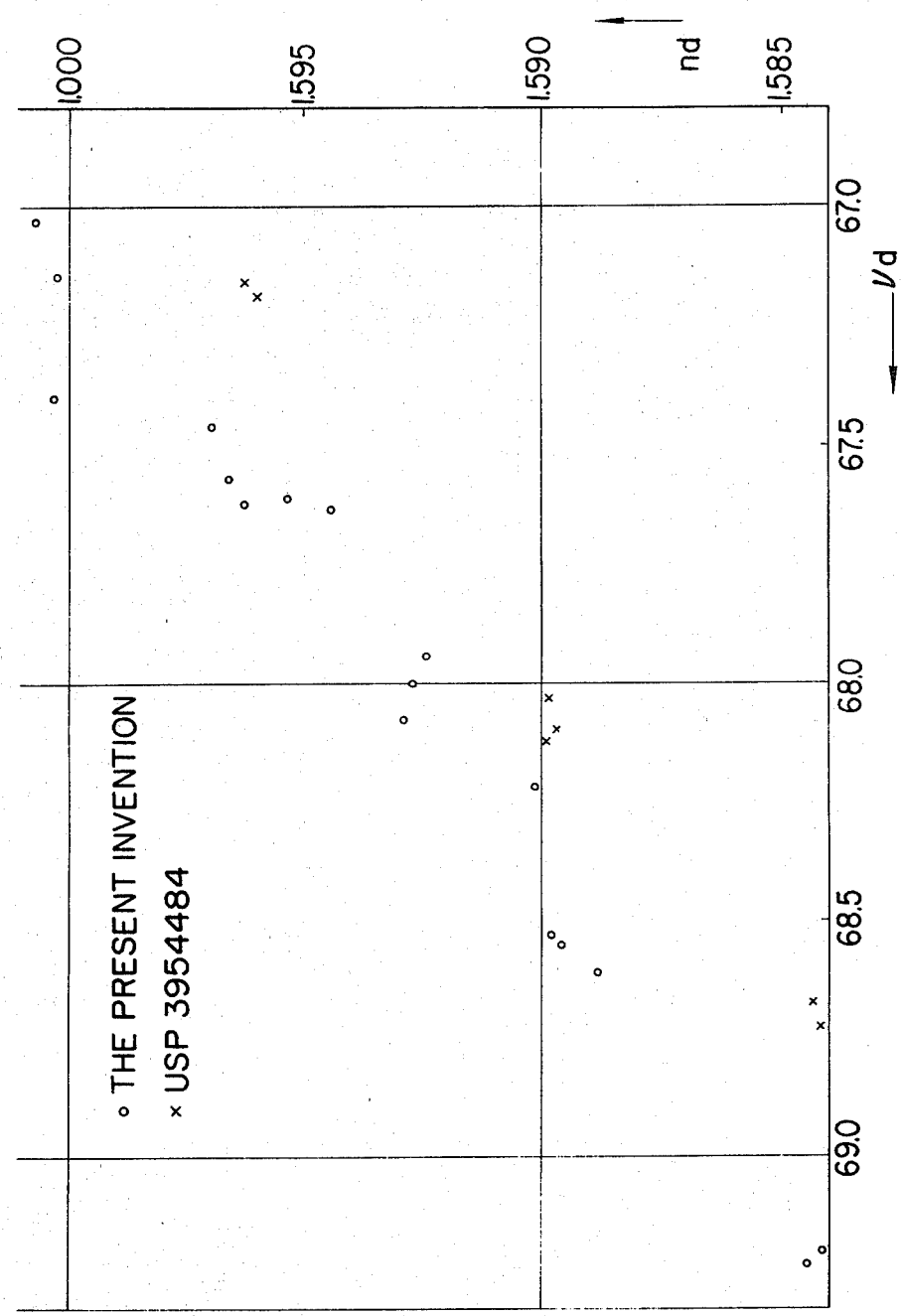
FIG. 1 shows the performances of the optical glasses with the horizontal axis representing the Abbe number and the vertical axis representing the refractive index.

The compositions (indicated in percent by weight), refractive indices ($\eta$d), Abbe numbers ($\nu$d) and partial dispersion ratios ($\eta$d−$\eta$c/$\eta$F−$\eta$C) of embodiments of the optical glass according to the present invention will be shown in Table 1 below.

TABLE 1

| Embodiments | 1 | 2 | 3 | 4 | 5 | 6 |
|---|---|---|---|---|---|---|
| Al(PO$_3$)$_3$ | 35.27 | 28.20 | 13.21 | 23.70 | 23.70 | 26.10 |
| Ca(PO$_3$)$_2$ | 1.00 | 1.00 | 18.31 | 1.00 | 2.37 | 1.00 |
| Ba(PO$_3$)$_2$ | 9.87 | 15.70 | 5.62 | 14.81 | 14.13 | 14.45 |
| MgF$_2$ | 6.50 | 11.74 | 7.90 | 4.42 | 3.72 | 8.26 |
| BaF$_2$ | 18.30 | 7.70 | 17.50 | 23.96 | 15.72 | 17.33 |
| AlF$_3$ | | | | | 6.53 | |
| BaO | 27.56 | 34.16 | 35.96 | 30.61 | 31.83 | 30.86 |
| Y$_2$O$_3$ | 1.50 | 1.50 | 1.50 | 1.50 | 2.00 | 2.00 |
| Yb$_2$O$_3$ | | | | | | |
| $\eta$d | 1.59011 | 1.58957 | 1.59529 | 1.59293 | 1.59403 | 1.59323 |
| $\nu$d | 68.22 | 68.55 | 67.61 | 67.52 | 67.34 | 67.48 |
| $\eta$d-$\eta$c/$\eta$F-$\eta$c | 0.3042 | 0.3027 | 0.3020 | 0.3033 | 0.3019 | 0.3019 |
| Embodiments | 7 | 8 | 9 | 10 | 11 | 12 |
| Al(PO$_3$)$_3$ | 23.90 | 23.70 | 23.30 | 23.60 | 24.50 | 22.10 |
| Ca(PO$_3$)$_2$ | 2.37 | 2.37 | 2.37 | 2.37 | 2.37 | 2.21 |
| Ba(PO$_3$)$_2$ | 14.13 | 14.13 | 13.90 | 17.57 | 14.62 | 13.18 |
| MgF$_2$ | 10.32 | 6.34 | 5.50 | 3.72 | 3.72 | 2.00 |
| SrF$_2$ | | | | 12.39 | 17.88 | |
| BaF$_2$ | 14.82 | 14.69 | 14.45 | 1.82 | 2.00 | 24.56 |
| AlF$_3$ | | 2.50 | 2.50 | 2.50 | 2.50 | 4.70 |
| YF$_3$ | | 2.34 | 4.62 | 2.32 | | |
| BaO | 32.46 | 32.43 | 31.86 | 32.21 | 26.82 | 27.99 |
| Y$_2$O$_3$ | 2.00 | 1.50 | 1.50 | 1.50 | 5.59 | 3.78 |
| Yb$_2$O$_3$ | | | | | | |
| $\eta$d | 1.594060 | 1.59292 | 1.59270 | 1.58984 | 1.58429 | 1.59442 |
| $\nu$d | 67.56 | 68.08 | 68.00 | 68.53 | 69.24 | 67.63 |
| $\eta$d-$\eta$c/$\eta$F-$\eta$c | 0.3024 | 0.3030 | 0.3032 | 0.3041 | 0.3038 | 0.3019 |
| Embodiments | 13 | 14 | 15 | 16 | 17 | 18 |
| Al(PO$_3$)$_3$ | 23.30 | 22.80 | 23.30 | 22.70 | 23.20 | 23.10 |
| Ca(PO$_3$)$_2$ | 2.37 | 2.37 | 2.37 | 2.37 | 2.37 | 2.37 |
| Ba(PO$_3$)$_2$ | 13.90 | 13.63 | 13.90 | 13.55 | 13.80 | 13.80 |
| MgF$_2$ | 6.24 | 5.00 | 5.50 | 3.60 | 6.19 | 3.64 |
| BaF$_2$ | 14.46 | 16.19 | 16.50 | 18.10 | 18.48 | 14.33 |
| AlF$_3$ | 2.50 | 3.40 | 2.50 | 3.85 | 2.50 | 4.40 |

TABLE 1-continued

| | | | | | | |
|---|---|---|---|---|---|---|
| BaO | 33.60 | 30.97 | 33.27 | 30.65 | 26.85 | 35.70 |
| $Y_2O_3$ | | | 2.66 | 5.18 | 6.61 | 2.66 |
| $Yb_2O_3$ | 3.63 | 5.64 | | | | |
| $\eta d$ | 1.59661 | 1.60032 | 1.59634 | 1.60071 | 1.59696 | 1.60027 |
| $\nu d$ | 67.57 | 67.40 | 67.62 | 67.04 | 67.46 | 67.15 |
| $\eta d-\eta c/\eta F-\eta c$ | 0.3018 | 0.3025 | 0.3028 | 0.3043 | 0.3040 | 0.3016 |

| Embodiments | 19 | 20 | 21 | 22 | 23 | 24 |
|---|---|---|---|---|---|---|
| $Al(PO_3)_3$ | 13.00 | 23.50 | 16.80 | 22.10 | 20.00 | 17.55 |
| $Mg(PO_3)_2$ | 19.50 | | | | | |
| $Ca(PO_3)_2$ | 2.35 | 2.35 | 6.30 | 2.21 | 5.35 | 5.48 |
| $Ba(PO_3)_2$ | 8.10 | 14.10 | 9.40 | 13.18 | 11.17 | 9.80 |
| $MgF_2$ | 2.50 | 7.30 | 3.72 | 6.25 | 5.05 | 3.45 |
| $SrF_2$ | | | 8.00 | | 6.80 | 6.95 |
| $BaF_2$ | 14.30 | 14.60 | 22.34 | 29.31 | 31.27 | 32.05 |
| $AlF_3$ | 6.50 | 2.50 | 4.40 | | | |
| BaO | 31.75 | 32.97 | 19.69 | 17.03 | 10.63 | 13.58 |
| $Y_2O_3$ | 2.00 | 2.68 | | 6.29 | 6.10 | 7.51 |
| $Yb_2O_3$ | | | 4.15 | 3.63 | 3.63 | 3.63 |
| ZnO | | | 5.20 | | | |
| $\eta d$ | 1.58802 | 1.59243 | 1.58276 | 1.59725 | 1.58405 | 1.59522 |
| $\nu d$ | 68.61 | 67.94 | 69.15 | 67.03 | 69.21 | 67.33 |
| $\eta d-\eta c/\eta F-\eta c$ | 0.3030 | 0.3030 | 0.3029 | 0.3033 | 0.3044 | 0.3025 |

| Embodiments | 25 | 26 | 27 | 28 | 29 | 30 |
|---|---|---|---|---|---|---|
| $Al(PO_3)_3$ | 22.90 | 22.55 | 21.20 | 22.55 | 21.85 | 21.20 |
| $Ca(PO_3)_2$ | 2.30 | 2.25 | 2.10 | 2.25 | 2.20 | 2.10 |
| $Ba(PO_3)_2$ | 13.65 | 13.45 | 12.65 | 13.45 | 13.05 | 12.65 |
| $MgF_2$ | 5.40 | 5.30 | 5.00 | 5.30 | 5.15 | 5.00 |
| $BaF_2$ | 16.25 | 16.00 | 15.00 | 16.00 | 15.50 | 15.00 |
| $AlF_3$ | 2.50 | 2.40 | 2.25 | 2.40 | 2.30 | 2.25 |
| BaO | 29.21 | 25.31 | 10.70 | 27.91 | 22.80 | 18.05 |
| $Y_2O_3$ | 2.62 | 2.57 | 2.42 | 2.57 | 2.49 | 2.42 |
| PbO | 5.17 | 10.17 | 28.68 | | | |
| $Nb_2O_5$ | | | | 7.57 | 14.66 | 21.33 |
| $\eta d$ | 1.60438 | 1.61799 | 1.66293 | 1.62764 | 1.65748 | 1.69330 |
| $\nu d$ | 62.44 | 57.86 | 46.33 | 54.25 | 45.88 | 39.35 |
| $\eta d-\eta c/\eta F-\eta c$ | 0.3020 | 0.3004 | 0.2942 | 0.2980 | 0.2943 | 0.2917 |

Figure 2:
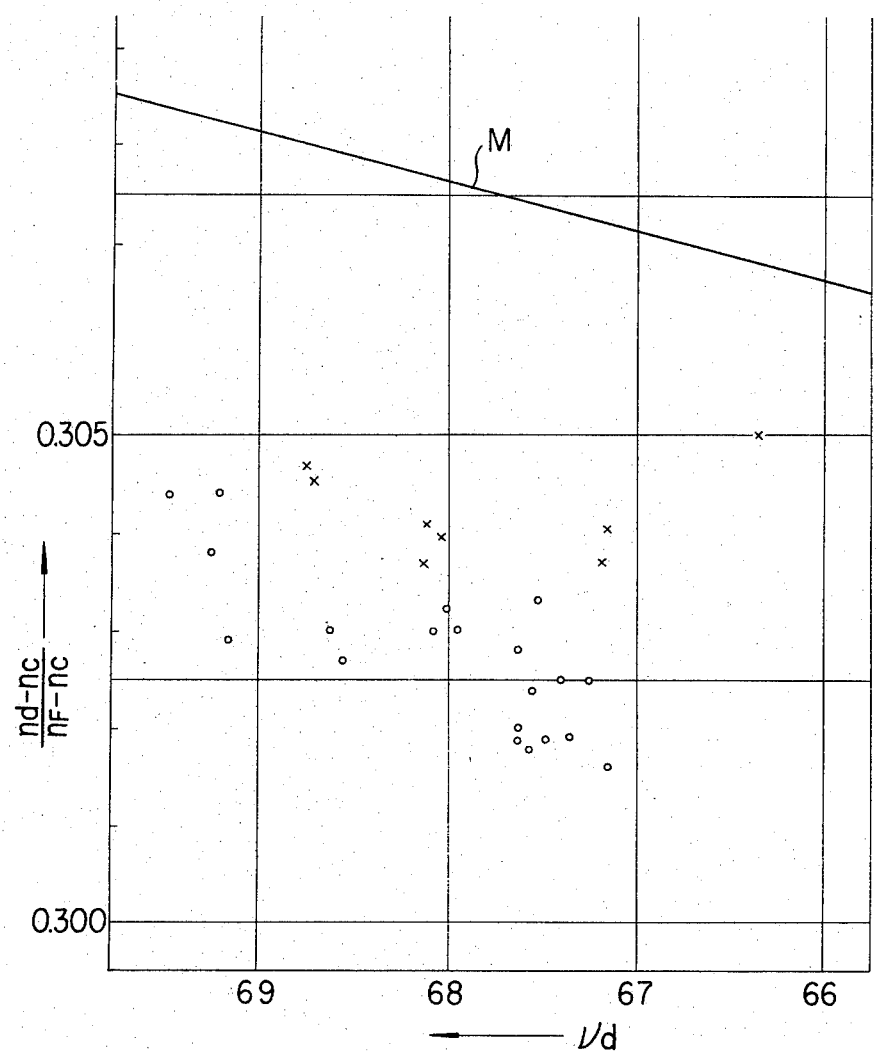
FIG. 2 shows the anomalous partial dispersions of the optical glasses with the horizontal axis representing the Abbe number and the vertical axis representing the partial dispersion ratio.

The comparison between the optical glass of each embodiment of the present invention and that disclosed in Japanese Patent Publication No. 28169/1978 is shown in FIGS. 1 and 2. In FIG. 1, the horizontal axis represents the Abbe number ($\nu d$) and the vertical axis represents the refractive index ($\eta d$), and this Figure is used for the evaluation of the most ordinary optical glasses, and those positioned in the left upper portion of the Figure are of higher refractive index and lower dispersion.

FIG. 2 is for showing the anomalous partial dispersion with the horizontal axis representing the Abbe number ($\nu d$) and the vertical axis representing the partial dispersion ratio ($\eta d-\eta c)/(\eta F-\eta c$), and the positions more distant from a straight line M in the Figure which shows the standard partial dispersion mean the greater richness in anomalous partial dispersion. FIGS. 1 and 2 show the comparison in the area of lower dispersion (in which the Abbe number $\nu d$ is 67 or higher) than that chiefly intended by the present invention and, in these Figures, the mark O represents the optical glass according to the present invention and the mark X represents the optical glass of Japanese Patent Publication No. 28169/1978.

As can be seen from FIGS. 1 and 2, the optical glass according to the present invention is nearly as low as or lower in dispersion than the optical glass disclosed in Japanese Patent Publication No. 28169/1978, and yet has a higher refractive index and greater anomalous partial dispersion than the latter.

According to the present invention, as has been described above, fluorophosphate optical glass having a relatively high refractive index and high anomalous partial dispersion can be obtained stably and easily on an industrial scale.

I claim:

1. A fluorophosphate optical glass having an index of refraction nd within the range of 1.58–1.70, an Abbe number vd within the range of 39–70, and a relatively high positive anomolous partial dispersion, which results from fusion of a batch of glass-forming compounds having the following ranges of composition in percent by weight consisting essentially of:

(a) metaphosphate raw material:

| | |
|---|---|
| $Al(PO_3)_3$ | 18.0–28.0 wt. % |
| $Mg(PO_3)_2$ | 0 wt. % |
| $Ca(PO_3)_2$ | 1.0–10.0 wt. % |
| $Ba(PO_3)_2$ | 10.0–15.0 wt. % | wherein the total amount of metaphosphate raw materials is 33–44 percent by weight, (b) fluoride raw material:

| | |
|---|---|
| $MgF_2$ | 2.0–10.0 wt. % |
| $SrF_2$ | 0 wt. % |
| $BaF_2$ | 1.0–33.0 wt. % |
| $AlF_3$ | 2.0–8.0 wt. % |
| $YF_3$ | 0 wt. % | wherein the total amount of fluoride raw materials is 19–36 percent by weight, (c) oxide raw material:

| | |
|---|---|
| BaO | 14.0–35.0 wt. % |
| $Y_2O_3$ and/or $Yb_2O_3$ | 1.5–5.0 wt. % |

| -continued | |
|---|---|
| ZnO | 0 wt. % |
| PbO | 0–29.0 wt. % |
| Nb$_2$O$_5$ | 0–22.0 wt. % | wherein the total amount of oxide raw materials is 30–39 percent by weight.

2. Optical glass according to claim 1, wherein
Ca(PO$_3$)$_2$ is 1.0–5.0 wt.%
Ba(PO$_3$)$_2$ is 12.0–15.0 wt.% and
BaO is 20.0–35.0 wt.%.

3. An optical glass according to claim 2, wherein
(a) metaphosphate raw material comprises:

| Al(PO$_3$)$_3$ | 20.0–25.0 wt. % |
|---|---|
| Mg(PO$_3$)$_3$ | 0 wt. % |
| Ca(PO$_3$)$_2$ | 1.0–3.0 wt. % |
| Ba(PO$_3$)$_2$ | 13.0–15.0 wt. % | wherein the total amount of metaphosphate raw materials is 33–41 percent by weight, (b) fluoride raw material comprises:

| MgF$_2$ | 3.0–9.0 wt. % |
|---|---|
| SrF$_2$ | 0 wt. % |
| BaF$_2$ | 13.0–20.0 wt. % |
| AlF$_3$ | 2.0–5.0 wt. % |
| YF$_3$ | 0 wt. % | wherein the total amount of fluoride raw materials is 19–30 percent by weight, (c) oxide raw material comprises:

| BaO | 25.0–35.0 wt. % |
|---|---|
| Y$_2$O$_3$ and/or Yb$_2$O$_3$ | 1.5–3.0 wt. % |
| ZnO | 0 wt. % |
| PbO | 0 wt. % |
| Nb$_2$O$_5$ | 0 wt. % | wherein the total amount of oxide raw materials is 30–37 percent by weight.

4. Optical glass according to claim 3, wherein BaO is 30.0–35.0 wt.%.

* * * * *